United States Patent [19]

Humblet

[11] Patent Number: 4,987,536
[45] Date of Patent: Jan. 22, 1991

[54] COMMUNICATION SYSTEM FOR SENDING AN IDENTICAL ROUTING TREE TO ALL CONNECTED NODES TO ESTABLISH A SHORTEST ROUTE AND TRANSMITTING MESSAGES THEREAFTER

[75] Inventor: Pierre A. Humblet, Cambridge, Mass.

[73] Assignee: Codex Corporation, Mansfield, Mass.

[21] Appl. No.: 193,391

[22] Filed: May 12, 1988

[51] Int. Cl.$^5$ .............................................. G06F 13/38
[52] U.S. Cl. ............................... 364/200; 364/242.94; 364/261.2; 364/260.1; 370/60
[58] Field of Search ... 364/200MS File, 900 MS File, 364/514; 370/60, 94, 16, 94.2, 94.3

[56] References Cited

U.S. PATENT DOCUMENTS

| | | | |
|---|---|---|---|
| 4,466,060 | 8/1984 | Riddle | 364/200 |
| 4,656,658 | 4/1987 | King | 379/221 |
| 4,736,363 | 4/1988 | Aubin et al. | 370/60 |
| 4,748,660 | 5/1988 | Deveze | 364/514 X |
| 4,771,424 | 9/1988 | Suzuki et al. | 370/86 |

OTHER PUBLICATIONS

Awerbuch et al. "A New Distributed Algorithm to Find Breadth First Search Trees", IEEE Trans. of Information Theory, vol. IT-33, No. 3, May, 1987, pp. 315-322
"Routing Data Networks", Data Networks, Bertsekas et al., Chapter 5, pp. 318-333, 1987.
"Shortest-Path Routing", Telecommunication Networks: Protocols, Modeling and Analysis, Schwartz, pp. 267-281, 1987.
Jacob Hagouel, "Issues in Routing For Large and Dynamic Networks", 1983, pp. 30-92.

*Primary Examiner*—Thomas C. Lee

[57] ABSTRACT

The communications network includes a plurality of interconnected nodes and communication links between nodes. Computing apparatus in provided for determining a shortest path from a starting node to a destination node. The computing apparatus is adapted so that each node forms a routing tree having nodes with indentities, branches with weights, and a distinguished node called a root. The routing tree is the estimated shortest path to all of the nodes and each node communicates its routing tree to each adjacent node. Upon receipt of a routing tree by a reference node from an adjacent node, the reference node stores the routing tree and produces a large tree having roots and branches by placing the reference node as the root of the large tree and creating branches from the reference node to the roots of the routing trees of the adjacent nodes. The lengths of the branches are equal to the lengths of the links from the reference node to the adjacent nodes. A breadth first search of the large tree is performed to determine a connected subset of the large tree where each node identity appears only once. The connected subset forms the new routing tree for the reference node. If the new routing tree differs from the previous routing tree, the new routing tree is broadcast to all adjacent nodes and the procedure is repeated until no new tree differs from a previous tree, thereby defining a final routing tree. The final routing tree includes the shortest path from the reference node to all connected nodes.

15 Claims, 3 Drawing Sheets

LOOPING IN FORD-BELLMAN

BUILDING THE ROUTING TREE AT NODE 2 AFTER FAILURE OF LINK (1,2)
NODE 2 REALIZES AT ONCE THERE IS NO PATH TO NODE 1

RECONFIGURATION FOLLOWING A TOPOLOGY CHANGE

BUILDING THE ROUTING TREES

NETWORK TOPOLOGY

INDIVIDUAL NODE ROUTING TREES

BUILDING THE ROUTING TREE AT NODE 2

COMMUNICATION SYSTEM FOR SENDING AN IDENTICAL ROUTING TREE TO ALL CONNECTED NODES TO ESTABLISH A SHORTEST ROUTE AND TRANSMITTING MESSAGES THEREAFTER

BACKGROUND OF THE INVENTION

This invention relates to a communications network including a distributed system to compute shortest paths in a network with changing topology.

One of the oldest and best known distributed algorithms is the Ford-Bellman method to compute shortest paths between nodes in a network. It was originally introduced in the Arpanet and is now in use in a large number of networks. It basically works as follows:

We have a network of links and nodes (processors). Each link (I,J) is characterized by a (direction dependent) length LEN(I,J) that can change with time The nodes execute the following distributed algorithm to keep track of the shortest distances between themselves and the other nodes.

Two kinds of information are maintained: the routing table RT—D(I,J), whose (I,J)th entries are maintained at node I to contain the estimate of the minimum distance between I and J; the neighbor table, NT—D(I,J,P), where the first two indices are node identities and the third is a link adjacent to the first node. If P=(I,M) NT—D(I,J,P) is used to save at I the latest value of RT—D(M,J) transmitted by M to I.

The algorithm consists of the following steps:

Initially RT—D(I,J) is set to $\infty$ for all J, except RT—D(I,I) which is set to 0, and all links are Down.

Whenever a link adjacent to I goes Up, node I sends records of the form (J, RT—D(I,J)) over it, for all nodes J.

When a node I receives a pair (J,D) over a link P, with I≠J, it sets NT—D(I,J,P) to D and it computes RT—D(I,J)=min(over p)NT—D(I,J,p)+LEN(p). If this results in a new value for RT—D(I,J), the record (J,RT—D(I,J)) is sent to all the neighbors of I.

The same computation is also performed at I for all nodes J not equal to I whenever the length of any adjacent link changes. In particular, the length of a Down link is considered to be infinite.

This basic prior art algorithm and a number of variations have been shown to converge to the correct distances if the link lengths stabilize and all cycles have strictly positive length. However, the convergence can be very slow when link lengths increase. In a typical example (FIG. 1) node 1 becomes disconnected. Nodes 2 and 3 keep executing the algorithm, slowly increasing their RT—D(.,1). This behavior is known as "counting to infinity". While this goes on messages destined to node 1 may cycle back and forth between nodes 2 and 3, a phenomenon called "routing table looping". In practice there are known upperbounds NN on the number of nodes and MAXLEN on LEN() and entries of RT—D that exceed (NN—1)*MAXLEN are set to $\infty$. If not all Up links have the same length, a better alternative is to keep track of the number of links in a shortest path, and to only accept paths up to a maximum number of links.

The looping behavior problem is a major drawback of Ford-Bellman distributed algorithms. To prevent it, techniques have been developed to "freeze" part of the network while the news of an increase in length propagates. This approach requires new types of messages and sometimes delays a node from obtaining a correct distance. Another approach reduces the likelihood of looping but, in our opinion, does not always prevent it.

It has often been noted that in the previous algorithm the RT—D(I,J)'s for different J's behave independently of each other and that one can focus on a single destination. To the contrary we remark here that much can be gained by considering the interactions between different destinations.

Assume we know the neighbor K next to the destination on the shortest path from a node I to a destination J. The following statements must be true if we have valid paths to K and J and $0 \leq LEN() \leq MAXLEN$:

(A) if a neighbor of I appears to be on a shortest path from I to J, it must also be on a shortest path from I to K.

(B) distance (J)$\geq$distance (K)

(C) distance (J)$\leq$distance (K)+MAXLEN

This suggests that keeping track of the nodes next to the destinations (on shortest paths) is important (this is different from keeping track of the next node on a path, which is only marginally effective). Although the previous relations could be used to quickly weed out unreachable nodes in Bellman-Ford type algorithms and prevent routing table looping, we will not use them directly in the rest of the specification. Rather, we note that keeping information at a node I about the nodes next to destinations is equivalent to keeping track of an entire shortest path tree rooted at I. This the view that we will exploit.

SUMMARY OF THE INVENTION

The communications network according to the invention includes a plurality of interconnected nodes and communication links between the nodes. The links have lengths and the nodes have unique identities. Referring to FIG. 4, computing, apparatus is provided for computing shortest paths from a starting node to all destination nodes, the computing apparatus adapted so that each node forms a routing tree having nodes with identities, branches with lengths, and a distinguished node called a root (1). The routing tree is the estimated shortest path to all of the nodes and each, node communicates its routing tree to each adjacent node (2) wherein upon receipt of a routing tree by a reference node from an adjacent node, the reference node stores the routing tree and produces a large tree (3) having roots and branches by placing the reference node as the root of the large tree. Branches from this root node to the roots of the routing trees of the adjacent nodes (stored in the reference node) are created, the lengths of the branches being equal to the lengths of the links from the reference node to the adjacent nodes. A breadth first search (with respect to the branch lengths) of the large tree is performed to determine a largest connected subset of the large tree where each node identity appears only once, the connected subset forming the new routing tree for the reference node (4). If the new routing tree differs from the previous routing tree, the new routing tree is broadcast to all adjacent nodes, and the procedure is repeated until no new tree differs from a previous tree thereby defining a final routing tree (5). The final routing tree includes the shortest path, from the reference node to all connected nodes (6).

In a preferred embodiment, the procedure is repeated at predetermined intervals or whenever there is a change in link lengths in the network. Further, upon a link failure, the length of the failed link is set to infinity. The lengths of the links may be direction dependent.

DESCRIPTION OF THE PREFERRED EMBODIMENT

Figure 1:
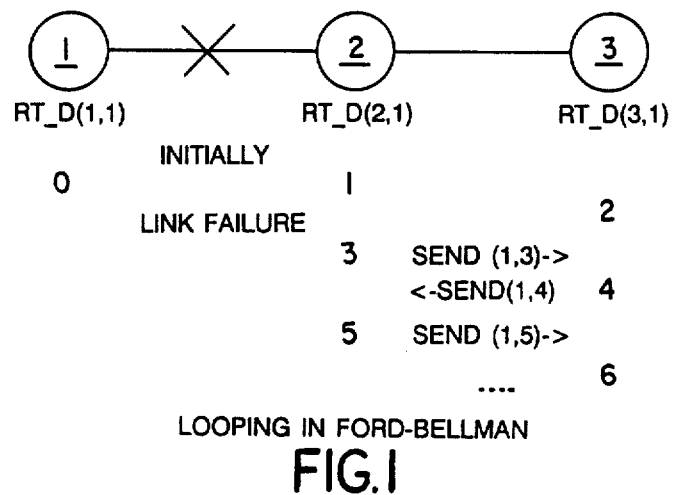
FIG. 1 is a schematic representation of a network illustrating looping.

Our goal in this invention is to keep track of an estimated shortest path tree at each node, and the "replica" of such a tree at the adjacent nodes. Although this could be done quite abstractly, we prefer extending the simple and explicit notation already used above.

(1) To keep track of a shortest path tree at a node I we use three kinds of Routing Table entries, RT— D, RT—N and RT—L. RT—D(I,J) is as before ;RT—N-(I,J) denotes the node next to J on the shortest path from I, while RT—L(I,J) indicates the link adjacent to I on a shortest path to J.

Note that entries RT—N(I,I) are meaningless and they will never used. In contrast NT—N(M,I,P) is always M at a node M adjacent to I, if P=(M,I).

(2) The Neighbor Table now contains two kinds of entries, NT—D and NT—N. NT—D(I,J,P) is as before while NT—N(I,J,P) is meant to be the node next to node J on a shortest path to J from node I, via link P.

(3) Messages sent by a node I consist of packets of records, each record being a triple of the form (J,RT—D(I,J),RT—N(I,J)).

The detail of the implementation appears below:

```
PART 1
Initialization of node I
RT_D(I,I)=0;
Node I detects link P comes Up
for each node J NT_D(I,J,P)= ∞;
send on P a packet containing records
(J,RT_D(I,J),RT_N(I,J)) for all nodes J;
Node I detects a change in LEN(P) for link P (LEN(P)=
∞ if P is Down)
within a finite time COMPUTE( );
Node I receives an update packet
from neighbor M on link P
The packet is composed of records (J,D,K), where J is a
node, D is a distance and K is a node.
for each record (J,D,K) in the packet {
NT_D(I,J,P)=D;
if (J=M) then NT_N(I,J,P)=I;
else NT_N(I,J,P)=K;
}
within a finite time COMPUTE( );
PART 2
COMPUTE() at node I
for all nodes J UNSEEN (J)=TRUE;
UNSEEN(I)=FALSE;
PACKET=nil;
For each link P, list the nodes J in order of
nondecreasing NT_D(I,J,P). Let TOP(P) denote the
element currently at the top of the list for link P.
While any list is not empty {
P*=argmin(over P) NT_D(I,TOP(P),P) + LEN(P);
J=TOP(P*);
Remove J from list P*;
```

-continued
```
if (UNSEEN(J) AND
((NT_N(I,J*)=I) OR (RT_L(I,NT_N(I,J,P*))=P*)))
then { if ((RT_D(I,J)NT_D(I,J,P*) + LEN(P*)) OR
(RT_N(I,J),NT_N(I,J,P*)))
then { RT_D(I,J)=NT_D(I,J,P*)+LEN(P*);
RT_N(I,J)=NT_M(I,J,P*);
PACKET=PACKET U
{(J,RT_D(I,J),RT_N(I,J));}
{
RT_L(I,J)=P*;
} }
if (PACKET nil) then send PACKET on all Up links;
```

This implementation is decomposed into two major parts: in the first part, a node observes local topology changes or receives update messages from neighbors; these updates are saved in NT. In the second major part (COMPUTE) each node I builds from NT—a large tree with weighted branches (FIGS. 2 and 3), where a node identity may appear many times; node I puts itself as the root and "hangs" on each adjacent link the shortest path trees communicated by its neighbors. This large tree is then scanned in a "breadth first" fashion (with respect to the cumulative branch weights from the root) to obtain a subtree where each node appears at most once. That subtree is adopted as the new "local" shortest path tree and changes (if any) with respect to the previous version are communicated to the adjacent nodes.

Figure 3:
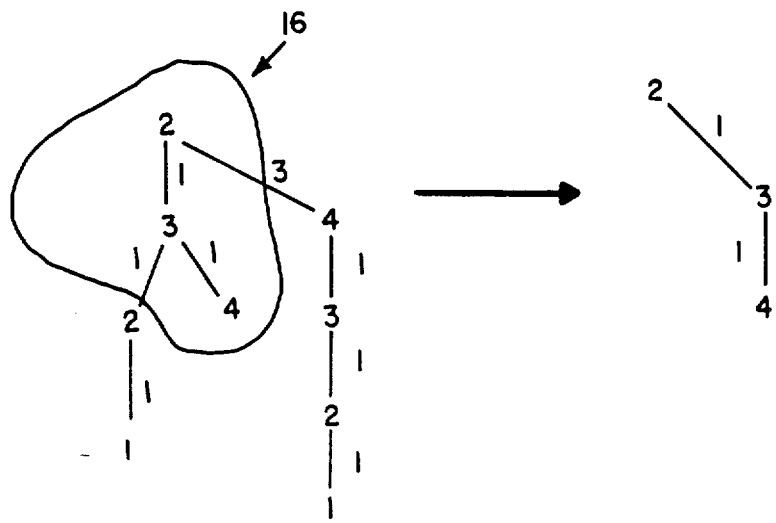
FIG. 3 is a schematic representation of a network illustrating reconfiguration following a topology change.
Figure 2A:
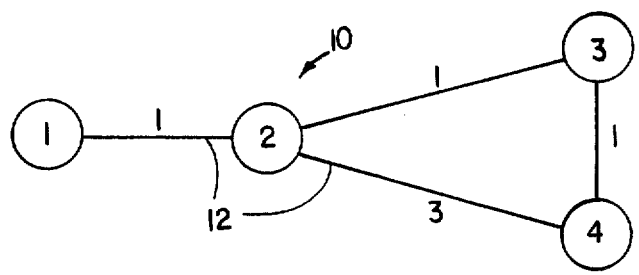
FIG. 2 which comprises FIGS. 2a, b, and c are schematic representations of networks utilizing the invention herein.
Figure 2B:
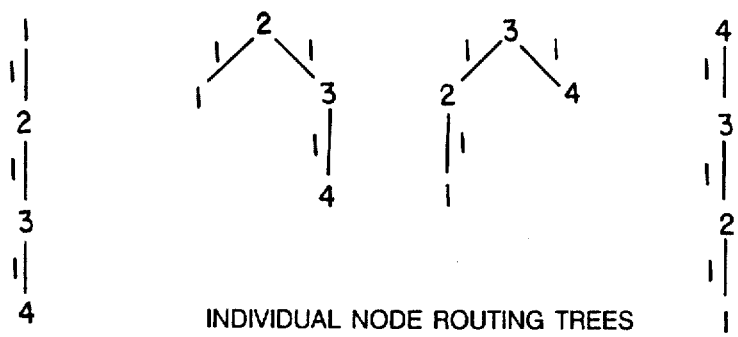
Figure 2C:
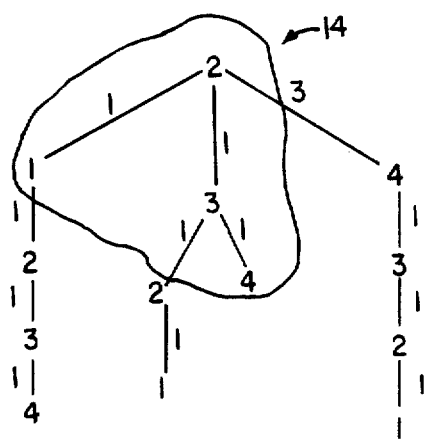
Figure 4:
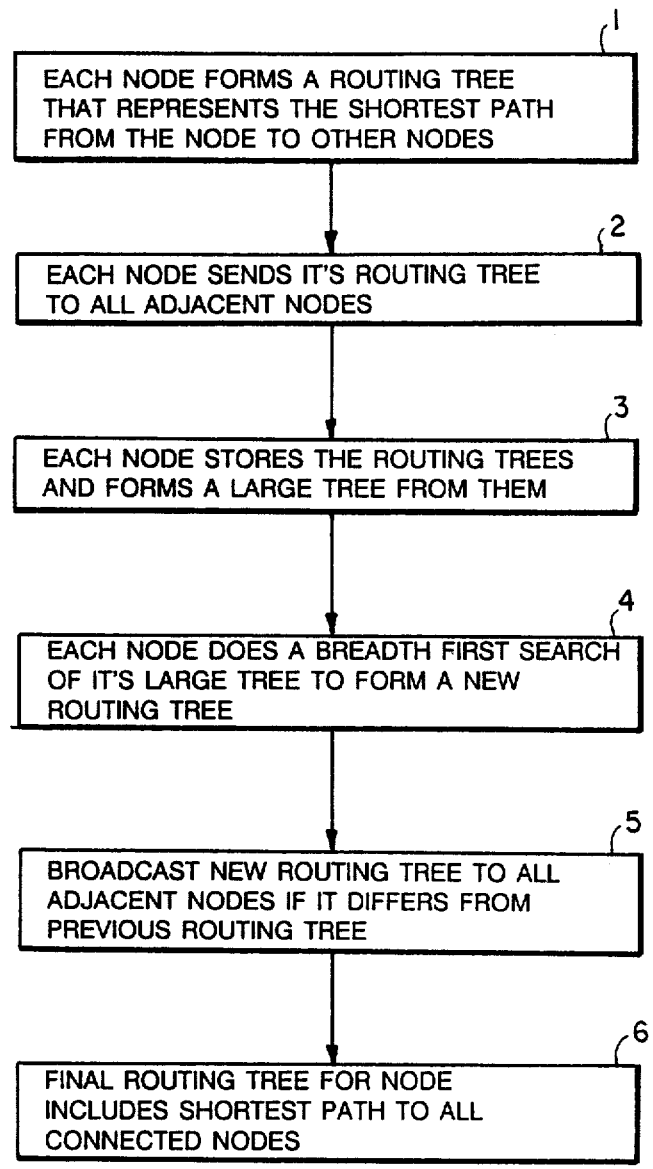
FIG. 4 is a flow chart useful in understanding the invention.

In particular, FIG. 2(a) depicts a network topology 10 including nodes 1-4 interconnected with links 12 having lengths denoted by the integers adjacent to the links 12. FIG. 2(b) shows the individual node routing trees for the nodes of FIG. 2(a). FIG. 2(c) illustrates the building of a routing tree 14 at node 2. As shown in FIG. 3, a routing tree 16 is a reconfiguration of the reouting tree 14 of FIG. 2(c) after a failure of the link 12 (FIG 2(a)) connecting nodes 1 and 2.

More precisely, COMPUTE() at node I builds RT—D and RT—N starting with I, considering nodes in order of nondecreasing distances from I, and including a node in RT only if it has not been included yet and if its neighbor toward I in NT already is in RT. Thus the RT structure forms a directed tree (this would hold even if the NT's did not form trees) that is composed of a root node out of which subtrees from the NT's hang. We will call that tree the Routing Tree.

The description set out above leaves vague exactly when COMPUTE() is executed, specifying only that it is executed within a finite time after a triggering event. Concrete possibilities will be suggested below.

Because it uses breadth first searches (with respect to total length), our technique can be seen as an adaptive distributed version of Dijkstra's algorithm. Other distributed but static implementations of Dijkstra's method have been given. These approaches should not be confused with those relying on an explicit topology broadcast followed by local computation.

The fact that COMPUTE() involves sorting nodes and that messages include identities of nodes next to destination may seem prohibitive. We indicate here how simple data structures can alleviate much of the difficulty. Below, NN denotes the number of nodes in the network and A(I) the number of links adjacent to node I.

For a given node I, nodes in the Routing Table and the Distance Tables can be organized as doubly linked lists, in order of increasing distances. Notice that COMPUTE includes records (J,D,K) in an Update message in order of non decreasing D so that the linked list for NT can be updated with an amount of processing not worse than linear in NN. Running COMPUTE() at a node requires an amount of processing not worse than linear in NN*A(I)*log(A(I)) as there are a total of NN*A(I) entries in the NT—linked lists and determining P* during a step can be done in time proportional to log(A(I)). Also in a record (J,D,K) node K must appear before J in the updated NT list. Thus the identity of K can be encoded as a number, e.g. specifying the position of K in the list. This can make significant savings in networks where node identities are character strings.

A more efficient (and complex) implementation is to keep a direct representation of trees for RT—and NT. When a new RT is computed, only the difference between the new and old trees needs to be communicated, e.g. as a set of subtrees. Recall that a subtree of N nodes can be transmitted as N node identities plus 2N bits. This can be done by walking along the subtree in depth first fashion, transmitting a node identity the first time it is met, transmitting a 0 bit each time a link is traversed away from the root, and a 1 bit when a link is traversed toward the root. If this is done, updating NT takes an amount of time proportional to the number of nodes in an update packet.

Other savings can be realized by using information specific to each network. For example in networks where link lengths change by small amounts, it is likely that the structure of the Routing Tree will often remain unchanged, although the lengths of some links change. It is easy to invent coding schemes taking advantage of this feature.

Various optimizations are also possible. For example when receiving an update message one can easily determine if COMPUTE() needs to be run. Also the subtree below J in a Routing Tree need not be sent to J while J is an adjacent node.

We define the time complexity of the technique of the present invention as the largest time that can elapse between the moment the last topology change occurs and the moment all nodes have final shortest paths to all other nodes. The message complexity is defined as the maximum number of node identities exchanged during that same period.

Before evaluating the complexity of the technique, we must precisely determine when COMPUTE() is evaluated after a triggering event in part 1 of the implementation set forth above. There are two traditional possibilities, and we also suggest another (A) event driven: run COMPUTE() whenever a topology change occurs or an update message is received. One expects that this would be the fastest. However, if the output links have finite capacity this might result in update messages queueing for transmission.

(B) periodic: run COMPUTE() at each node on a periodic basis, the periods need not be the same at all nodes. This has the effect of delaying propagation of changes, but may reduce the computational load and the number of transmitted messages.

(C) The third possibility combines the advantages of (A) and (B): use (A) but avoid the possible queuing of messages by combining all messages queued on a link into a single one. That message indicates all the changes that must be made to NT at the receiving end in order to obtain there the image of the current RT at the source.

If the procedure is operated in an event driven manner, little can be said about the time necessary for the procedure to complete, or about the number of messages that need to be exchanged. Examples can be devised to show that the number of messages may grow exponentially with the number of topology changes.

Regarding the communication complexity, we can make a statement if one assumes both that all messages are processed within one time unit after being generated and that at most one message can traverse a link within a time unit. Those can be realistic assumptions in cases (B) and (C). Time bounds can then be transformed into bounds for the communication complexity; it does not exceed a function linear in NN*NL*min(NN,R*Diam), where NL denotes the number of links, and Diam is defined as the maximum number of links in a shortest path.

As we have seen above, the time complexity of the Ford-Bellman technique is much higher than that of our algorithm as routing table looping can occur. Shortest paths can also be computed by broadcasting the topology and performing local computation. This approach typically is faster and requires fewer messages. However, it requires more storage and processing is not distributed; each node computes its Routing Tree independently, while in our approach a node benefits from the computation done by the neighbors. The difference is striking in the case of nodes that have only one adjacent link. Although we prefer the topology broadcast method if enough memory is available, we advocate the technique presented in this paper as a migration path for networks that currently use Ford-Bellman. Our method uses similar data structures and messages, but it does not suffer from routing table looping.

What is claimed is:

1. In a communications network in which a plurality of nodes having unique identities transmit messages over links that have lengths between the nodes, a machine implemented method for sending massages from a first node to a destination node over a shortest path from the first node to the destination node, comprising the steps of:

forming a first routing tree for said first node that represents an estimated shortest path from said first node to other nodes and that includes all nodes that are connected by a link to said first node, one node in said first routing tree serving as a root of said first routing tree, sending, by said first node, an identical tree to all said nodes that are connected by a link to said first node, said identical tree comprising at least a portion of said first routing tree: receiving, by said first node, respective routing trees transmitted by said nodes that are connected by a link to said first node; and storing, by said first node, the received routing trees, forming a new routing tree for said first node using said received routing trees, said new routing tree including a group of said nodes one of which is said destination node, comparing said new routing tree to a previous routing tree at said first node and, if said trees are different, determining a subsequent new routing tree that is not different from said previous routing tree, whereby said subsequent new routing tree defines the shortest paths from said first node to all of said nodes in said group, and transmitting messages from said first node to said destination node over the shortest path for said destination node defined by said new routing tree.

2. The method of claim 1 wherein said step of forming said new routing tree comprises
   forming a large tree by placing said first node as the root of said large tree and creating branches that have lengths from said first node to roots of the routing trees of said nodes that are connected by a link to said first node, the lengths of said branches equaling the lengths of the links from said first node to said nodes, and
   determining said new routing tree based on said large tree.

3. The method of claim 2 wherein said step of determining said new routing tree comprises
   finding a largest connected subset of said large tree in which each node appears only once, said subset being said new routing tree.

4. The method of claim 3 wherein said step of finding the largest connected subset includes performing a breadth first search of the large tree.

5. The method of claim 4 wherein said step of determining a subsequent new routing tree comprises broadcasting said new routing tree to all said nodes that are connected by a link to said first node and repeating said breadth first search, comparing, and broadcast steps until no new routing tree differs from a previous routing tree.

6. The method of claim 1 further comprising storing said subsequent new routing tree.

7. The method of claim 5 wherein said breadth first search, comparing, and broadcast steps are repeated at predetermined intervals or whenever there is a change in the lengths of the links in the network.

8. The method of claim 1 further comprising setting the length of a link to infinity upon a failure of said link.

9. The method of claim 1 wherein the lengths of the links are direction dependent.

10. The method of claim 5 wherein said step of determining a subsequent new routing tree comprises broadcasting only the differences between the new routing tree and a previous routing tree to all nodes that are connected by a link to said first node and repeating said breadth first search, comparing, and broadcast steps until no new routing tree differs from a previous routing tree.

11. The method of claim 1 comprising performing said steps of sending the first routing tree, receiving the respective routing trees from said nodes that are connected by a link to said first node, and forming said new routing tree whenever a change occurs in one or more of the links in said network.

12. The method of claim 1 comprising performing said steps of sending the first routing tree, receiving the respective routing trees from said nodes that are connected by a link to said first node, and forming said new routing tree in response to receipt of a routing tree from another node.

13. The method of claim 1 comprising performing said steps of sending the first routing tree, receiving the respective routing trees from said nodes that are connected by a link to said first node, and forming said new routing tree at predetermined time intervals.

14. The method of claim 13 wherein the predetermined time interval for said first node is different than that for another node in said network.

15. The method of claim 1 wherein said step of determining said subsequent new routing tree includes repeating at least some of said steps at least once.

* * * * *